United States Patent

[11] 3,544,762

| | | |
|---|---|---|
| [72] | Inventor | Paul Eisler |
| | | 57, Exeter Road, London, NW 2, England |
| [21] | Appl. No. | 585,552 |
| [22] | Filed | Oct. 10, 1966 |
| | | Continuation-in-part of Ser. No. 165,736, Jan. 12, 1962 |
| [45] | Patented | Dec. 1, 1970 |
| [32] | Priority | Jan. 20, 1961, May 31, 1966 |
| [33] | | Great Britain |
| [31] | | Nos. 2,384/61 and 24,069/66 |

[54] METHOD OF SEPARATING PORTIONS OF A TRANSPORTED BODY BY RESISTANCE HEATING
21 Claims, 15 Drawing Figs.

[52] U.S. Cl. ........................................... 219/200,
62/351; 219/317; 221/150
[51] Int. Cl. ........................................... H05b 1/00
[50] Field of Search ........................................... 219/200,
19(D), 201, 19.10, 213, 317; 221/150, 73;
126/343.5; 99/(Inquire); 62/349—354, 341, 73,
362; 224/(Inquire)

[56] References Cited
UNITED STATES PATENTS

| 1,909,973 | 5/1933 | Lewis et al. ................ | 219/317X |
| 2,454,091 | 11/1948 | Rietz ............................ | 219/317 |
| 2,472,178 | 6/1949 | Temple ........................ | 219/317 |
| 2,912,555 | 11/1959 | Jamison ....................... | 219/213X |
| 868,495 | 10/1907 | Shipley ........................ | 62/351 |
| 1,615,411 | 1/1927 | Shipman et al. ............. | 62/351 |
| 1,852,064 | 4/1932 | Rosenberg ................... | 62/351X |
| 1,974,146 | 9/1934 | Barnes ......................... | 62/351X |
| 1,977,608 | 10/1934 | Blystone ...................... | 62/350X |
| 2,069,567 | 2/1937 | White ........................... | 62/351X |
| 2,115,944 | 5/1938 | De Witt ....................... | 62/351X |
| 2,468,492 | 4/1949 | Gazda .......................... | 62/351X |

OTHER REFERENCES
German Printed Application, H. Sommer et al. 1,160,715 January 1964. 219/385

*Primary Examiner*—J. V. Truhe
*Assistant Examiner*—C. L. Albritton
*Attorney*—Watson, Cole, Grindle and Watson ABSTRACT: A method of positioning a dispensable electric resistance heating film over zones of the film in close heat conducting relationship to the layer reached by heat to reduce its viscosity and transport the body and supply sufficient electrical energy to the film for the resulting dissipation of heat to at least that necessary to achieve the critical weakening of the cohesive forces in the layer.

PATENTED DEC 1 1970 3,544,762

Inventor
Paul Eisler
By
Watson, Cole, Grindle & Watson
Attys.

PATENTED DEC 1 1970 3,544,762

Inventor
Paul Eisler
By
Walsm, Cole, Grindle & Watson
Attys.

Inventor
Paul Eisler
By Watson Cole Grindle & Watson, Attys

METHOD OF SEPARATING PORTIONS OF A TRANSPORTED BODY BY RESISTANCE HEATING

This application is a continuation-in-part of my U.S. Pat. application Ser. No. 165,736 filed Jan. 12, 1962 for Electrical Heating Film, since matured into U.S. Pat. No. 3,283,284.

The present invention relates to electric heating by means of a heating film, that is to say, a thin, usually flexible structure incorporating at least one electrically conductive layer which is so thin that its thickness is minute compared with its surface dimensions, the layer incorporating or being provided with terminal areas accessible at the boundaries of the film, the terminal areas and the nature and or patterning of the conductive layer being such that when the terminal areas are connected to a supply of electric current, the current flow and distribution produce a substantially uniform heat distribution over at least predetermined zones of the area of the film.

For the purposes of the present invention the film is preferably designed so that the desired rate of heat dissipation is obtained when a low voltage supply is used. By low voltage is meant a voltage which is not dangerous if human contact is made with the conductive layer, which in practice generally means a voltage below 50 volts. A low voltage has advantages for the present purposes, which will be pointed out later, which are quite additional to the safety aspect.

The conductive layer of the heating film could consist of a high resistance material such as carbon or graphite uniformly distributed on a thin support layer of insulating material such as paper, or between two such layers with terminal zones of metallic foil so that over any terminal zone the potential is sensibly the same. Alternatively a carbon film (provided with terminal zones of metallic foil) might be used, that is a film made from carbon by processes similar to paper making or by processes of weaving or felt making similar to those used with asbestos as described in my application Ser. No. 368,544 filed May 19, 1964, for Electric Batteries now matured into U.S. Pat. No. 3,390,014. A simple example of such a film using carbon as the conductor would be a rectangular film with a terminal zone over the whole length of two opposite margins. Then even though connection to the supply were made at small areas of the two terminal zones, each of the two terminal zones would be at the same respective potential and the current flow would be substantially uniform across the conductive layer from one terminal zone to the other, and the heat development would be uniform over the whole area. Usually, however, the conductive layer of the heating film will contain a pattern of parallel metallic foil strips or arms. Thus terminal zones of foil extending longitudinally (for example along the two opposite margins) may have integral strips or arms extending laterally, the strips or arms on one terminal lying between those on the other, leaving gaps between them which are bridged by carbon or graphite, so producing a uniformly distributed conductive pattern of appropriate resistance; the whole being supported on a sheet of insulating material or more usually between two such sheets. An example of such a pattern is to be found described with reference to FIG. 11 in my U.S. Pat. No. 3,033,970.

It is preferred, however, to make the whole conductive layer of terminal zones and a pattern of parallel strips or arms which form conductive paths between the terminal zones, in particular a meander pattern consisting of substantially parallel conductive arms with narrow elongated insulating spaces between the arms and bridges joining the ends of the arms, which is so thin that the thickness is minute compared with the surface dimensions while the pattern is distributed over and occupies the area from which the heat is to be dissipated, insulation being provided on one or both faces and/or in the spaces between the arms. Such a conductive layer is desirably made from metallic foil, especially aluminum foil, and a preferred construction of such a film is described in the parent application Ser. No. 165,736 now U.S. Pat. No. 3,283,284 aforesaid while methods and apparatus for making it are disclosed in my application Ser. No. 510,278 filed Nov. 29, 1965 now U.S. Pat. No. 3,408,735 for Manufacture of Patterned Webs.

An electrical heating film as defined above can be made thin, flexible, and inexpensive and of extremely wide application in that it can be placed almost anywhere within or on the boundary of any space or substance as an instantaneous and homogenous source of heat of any desired temperature below that at which the material or materials used in the essential structure of the heating film itself would melt or be destroyed. The space required for the heating film is so negligible in view of its thinness and the cost of the heating film per unit area in most constructions is so low, namely of the order of that of normal dispensable packaging material, that there is no substantial spatial or economic reason in almost any field of use of the film for restricting the heat-emitting area constituted by the area of the film. This use of a large area of heating film again permits the desired quantity of heat energy to be emitted at the lowest useful temperature.

The present invention is concerned with the movement from its location, of a body or a part of a body, the whole or a portion of which comprises at least one layer of a substance the viscosity of which can be reduced by heat to such an extent that the cohesive forces in the substance essential and adequate to maintain the body in its location under ambient conditions are critically weakened. Once such a state is reached, the body or a portion of it can be moved from its location either by natural forces such as gravity or by the application of mechanical forces, in the latter case usually to the part of the body which lies to one side of the aforesaid layer. To accomplish this critical weakening of cohesive forces the method of the invention includes the steps of positioning an electric resistance heating film in such spatial and heat conductive relationship to the aforesaid layer that heat dissipated by the film will reach the layer and thereby reduce its viscosity, and supplying sufficient electrical energy to the film for the resulting dissipation of heat to be at least that necessary to achieve the c ritical weakening of the cohesive forces in the aforesaid layer.

The layer in question may be a fluid which is so viscous at ambient temperature that its ability to flow is too low for practical use but which is rendered less viscous and more fluid by heat, or it may be a solid fusible substance which is melted, or melted and then vaporized, or which is sublimed, by heat according to the amount of heat and the conditions of operation. In these cases there is a change of state and in some cases this may be a change which will reverse on cooling. The operations in many cases are performed under ambient conditions that is under conditions of atmospheric pressure and room or outdoor temperature. In other cases the positioning may involve melting followed by setting or freezing of a substance which is liquid at ambient temperature while the heating may be performed under ambient conditions. Again the film will usually be located within the body, in many cases against or within the actual layer to be heated.

One very useful application of the invention which involves melting of a solid substance is the separation into portions or sub blocks of large bulk blocks incorporating material to be transported. Such bulk blocks may simply be the material itself which is solid either at ambient temperature or at a lower temperature, or they may be bulk blocks of frozen commodities such as foodstuffs or pharmaceutical preparations, or they may be commodities or objects potted in blocks of material, e.g. ice, which can be melted by the application of heat, or consist of individual small blocks which may be packages or blocks of material which have been held together by layers of fusible adhesive which hold at ambient temperature but which can be softened by heat, and within which the films are in heat conductive relationship. Once the critical weakening of the cohesive forces has been achieved direct forces, whether gravity or mechanical, are brought into action whereby the portion or small block or package is caused to slide in relation to the rest of the bulk block and thus become separated.

Another purpose is to render a material which is solid at ambient temperature, or so highly viscous at that temperature that its ability to flow is too low for practical use, sufficiently fluid to enable it to flow readily for spreading or simply for discharge from a storage vessel. Thus the invention can be applied with advantage to asphalt, or other bituminous compounds, coal tar, or a calking gap-filling or jointing compound as used in building, civil engineering and similar operations. It can also be applied with advantage to the removal of the materials just mentioned or waxes or phenol from drums or other storage containers.

Other classes of material are materials which are to be sublimed or vaporized, for example a road surface or other large area which has to be heated for deicing, or frost prevention or defogging.

Another example is the sublimation of moisture during accelerated freeze drying under vacuum and yet another is the removal of ice from the condenser which cooperates with the vacuum pump in an accelerated freeze drying plant.

Yet another example is the sublimation or vaporization of the active agent in a refrigerator of the absorption type.

The invention will be further described with reference to the accompanying highly diagrammatic drawings in which.

As a first example of the application of the invention to the transport of material, frozen fish has been chosen.

In seagoing trawlers the freezing of fish, headed and gutted, into large slabs a few inches thick and weighing about as much as a porter can carry, has become an established practice. The storing and handling of these separate slabs in refrigerated compartments of the vessel and their unloading is a heavy and unhealthy task for manual labour, particularly in the docks.

Figure 1:
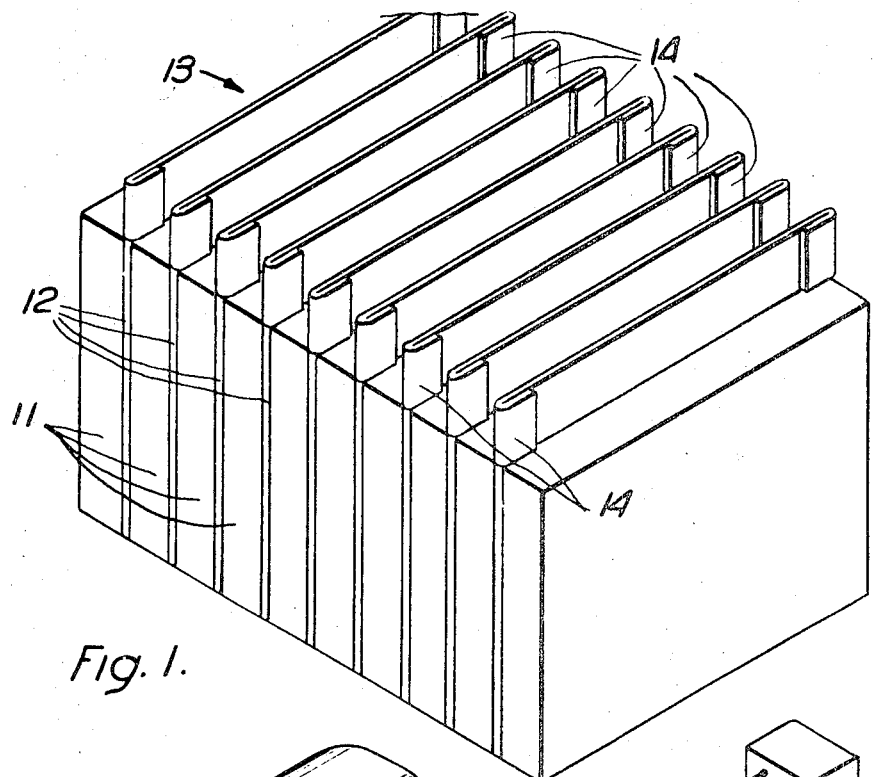
FIGS. 1 and 2 are perspective views illustrating a first mode of practicing the invention.

In applying the present invention such slabs 11 (FIG. 1) are put together, with a heating film 12 between them, so that they freeze into a solid large firm bulk block 13 of a size and weight which is economically as well as logistically practical, and is ready to be shifted by moving platforms and cranes, instead of the slabs 11 being carried singly by porters. The size of the bulk block must, of course, be small enough to pass through the hatchway of the ship. The assembly and freezing together of the slabs can be done automatically when the slabs emerge from the freezer and are stacked one on top of another, while a heating film is interleaved between adjacent slabs with its terminals 14 formed by folding over busbars remaining accessible. FIG. 1 shows the block 13 after it has been turned from the vertical to the horizontal position.

The surface of the frozen bulk block is a small fraction of the sum of the surfaces of the slabs forming it, and its storage in the vessel therefore not only saves in space and in storage structures, such as racks and shelves, but also in energy requirements while it is in the cold store or in a refrigerated insulated transport container.

Transport of the bulk unit is relatively simple if it continues traveling by road or rail after having been hauled by crane out of the vessel. Indeed, the danger of melting of the large mass with so relatively small a surface can be so reduced by suitable thermal insulation of the package or container that journeys of limited duration can often be made without artificial refrigeration inside the container or only with the protection of a primitive cover, preferably of a complete envelope of foamed plastic.

At the destination point any or all of the heating films are connected to a suitable electrical supply, such as to a low voltage line from a mains-energized transformer or from a generator and/or accumulator on the transport vehicle. The heat generated in the film quickly melts the interfaces between the heating film and the slabs which then slide apart readily. This partitioning of the deep-frozen bulk block into subblocks each consisting of one or more slabs can be effected as the container travels round, according to distribution requirements one by one, whereby only one film or one film after the next is energized at each stop, or the bulk can be partitioned into halves, quarters or into as many slices as there are slabs by energizing the respective films, or all films, subsequently or simultaneously. Gravity readily supplies the force for the sliding as long as the films and the slabs are in a vertical or inclined position in the bulk block, and the block is moved far enough along the supporting platform for the slabs to be removed to overhang the edge of the platform. Thus as shown by way of example in FIG. 2 a bulk block 13a similar to that of FIG. 1 is shown set on a lorry platform 15, with the films 12a in the vertical plane and with the block in such position that the last slab 11a overhangs the platform and the film 12a which lies between this slab and the remainder of the block just beyond the edge of the platform. This particular film is shown energized from a low voltage supply 16 which can be drawn for example from a mains-fed transformer. As soon as the ice melts adjacent this energized film, the last slab will slide off in one piece and may be guided in a desired direction by a chute indicated at 17. A switch 18 controlling the supply may be provided, located to be actuated by the movement of the slab when it slides off to cut off the supply either directly or to a transformer where that is used.

Figure 3:
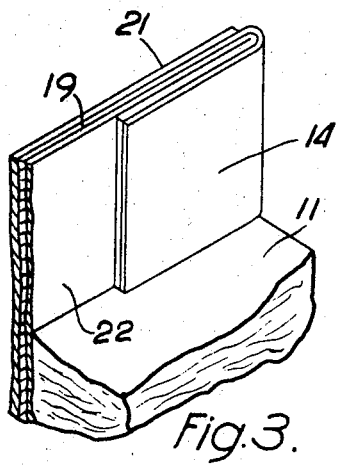
FIG. 3 is a detail of FIG. 1 on a larger scale.

The heating film 12a, being dispensable, can be left on the slab 11a sliding off the bulk block 13a and can be used in subsequently melting the slab itself, at the delivery point. It is preferable for such a purpose to use a heating film as shown in FIG. 3 comprising a conductive layer such as a patterned metal foil 19 between two thin insulating layers one of which 21 has better thermally conductivity than the other 22 for instance by being thinner or of a different material, say plastic film, while the other is a thicker film or paper. The foil pattern includes busbars which are folded over to constitute the accessible terminal 14.

Figure 2:
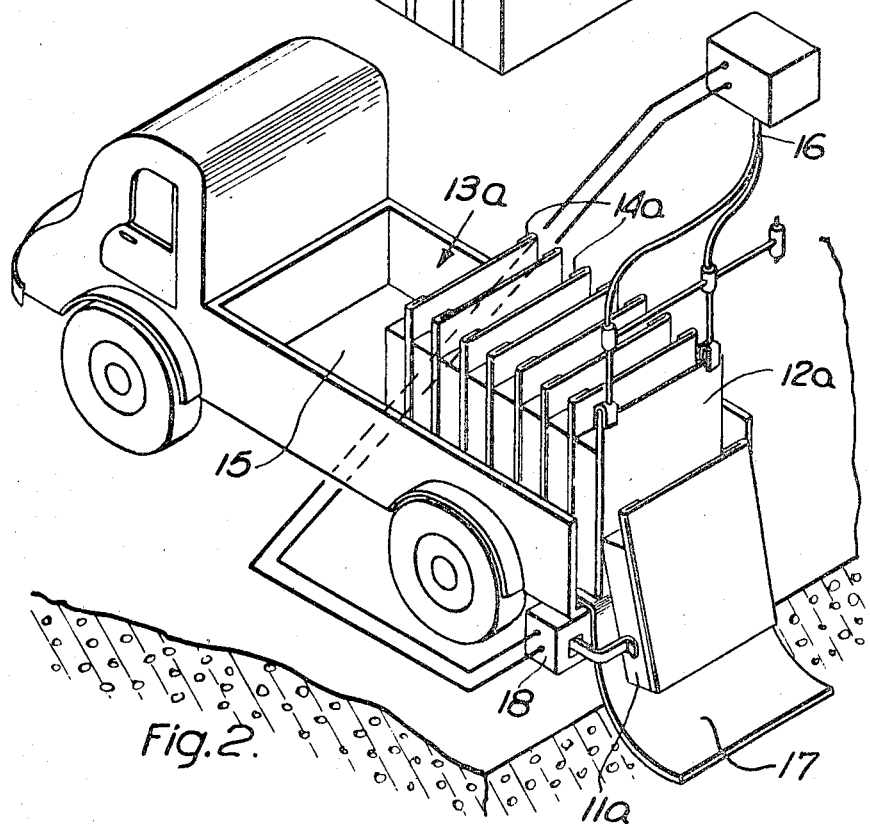

If a current shock or pulse is passed through such a film the interface melting first will be the one at the thermally less insulating layer 21, and the adjacent slab or slabs will slide off. The film, being switched off as soon as the sliding has sufficiently progressed, as by the switch 18 above described, will as shown in FIG. 2, stay on, or is kept on the block, and will serve as an end cover of the next slab to be slid off when the next heating film is connected. It remains adhering to the end slab when this slides off and can be used to melt or heat it after this slab has been removed. The orientation of the block 13a on the platform 15 is governed by the use of heating films with thermally unsymmetrical insulation, the block being placed so that thermally less insulating layers 21 face towards the end at which the slabs are removed.

Frozen fish is only illustrative of a great variety of goods and substances which can be solidified or allowed to solidify into a solid mass in which heating films are interspersed on the lines above described. These films cover such cross-sectional areas and are spaced at such distances that the slices or subblocks into which the bulk block will be partitioned are of the shape and weight desired at the distribution point. This partitioning is effected almost without effort when the interface between the solid and the heating film becomes liquid (i.e. in this case melts), and thus has the cohesive forces which hold the subblocks together under ambient conditions, critically weakened.

Thus, not only frozen foods of various kinds and food or pharmaceutical packages can be frozen into a large block of ice for storage and transport purposes, but ice itself, and many chemicals which are at present transported as hot liquids in heated and/or insulated bulk containers, such as phenol, waxes, bitumen and coal tar, can be stored and transported as described with reference to the example.

Chemicals which are solid at ambient temperature can be transported without thermal insulation and portions be sliced off the bulk block as required by switching on the requisite heating film at the delivery point. No heated tankers, no containers for the sliced-off chemical are needed anymore, and there is an all-round saving in energy, handling space, and so forth.

Figure 4:
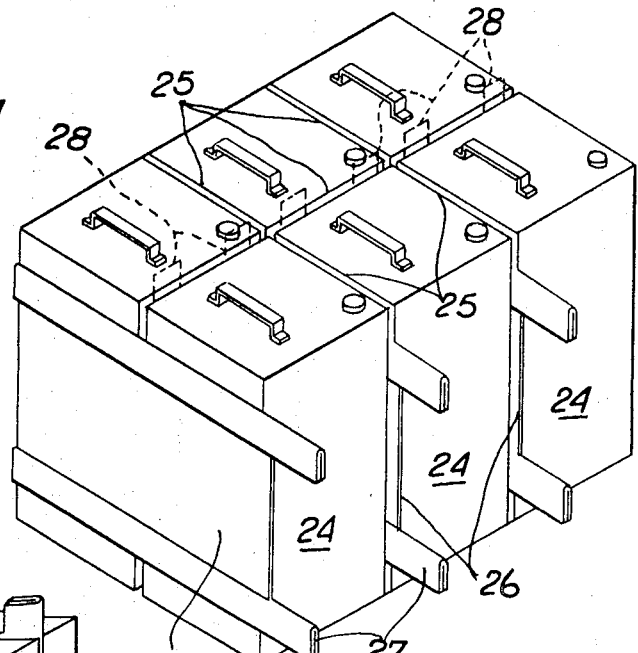
FIG. 4 is a perspective view illustrating the application of the invention to separate containers.

Closed packages can be held together by ice or by a hot melt adhesive which holds sufficiently at ambient temperature, and can have heating films embedded in the layer of ice or adhesive. By way of example FIG. 4 shows a series of rectangular containers 24 held together in this way at 25, heating films 26 with accessible terminals 27 being embedded in the layers 25. As shown the containers are in pairs and each pair can be released. By providing further films disposed in the layers 25 as indicated by the chain lines 28, individual containers could be released.

Figure 5:
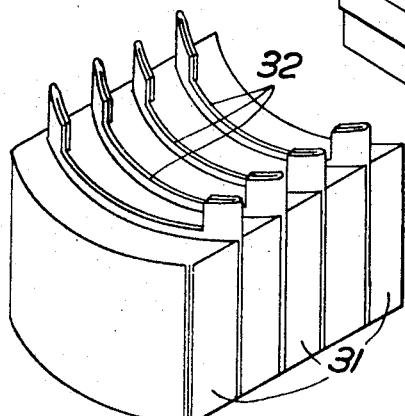
FIG. 5 is a perspective view of a modification of FIG. 1 in which the interface between the subblocks is not flat.

The slices or subblocks of frozen or solidified material between which the heating film is interleaved and which cohere in a bulk block need not be slabs with large flat and parallel faces, but can have any shape which permits them to interlock with, or nest and stack one in another provided that the shape of the mating faces permits adjacent slabs to slide over one another or to be separated and become free by a very small relative displacement as soon as the interface is brought to the melting point. A simple example is shown in FIG. 5 in which subblocks 31 are shown with part cylindrical end surfaces between which films 32 initially flat structure are embedded.

A certain practical limit to the shape of nesting slices is the availability of a heating film which is to lie snugly in the interface. Therefore and in view of the cost involved in producing special forms of the slice and of the film, the preferred shape for the interface is a plane or a surface which can be developed into a plane.

Only in special circumstances where the slice of a particular nature and special interlocks are required, for instance for strength purposes, it is proposed to deviate from the above preference. The transport of frozen meat carcasses or of other very irregularity shaped goods having a very unbalanced and eccentrically distributed weight may come under this heading. The cohesive forces at a simple interface may not stand the stresses on vibration of such goods, or not even those of the normal acceleration and deceleration of their heavy masses during sea transport.

Figure 6:
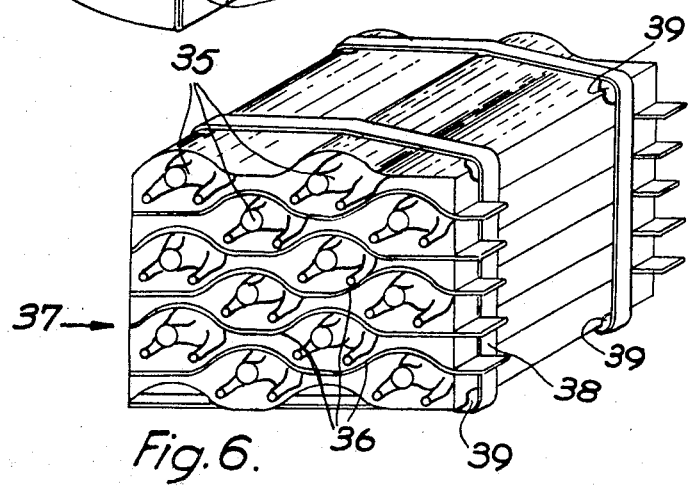
FIG. 6 is a perspective view illustrating the application of the invention to the transport of meat carcasses.
Figure 7:
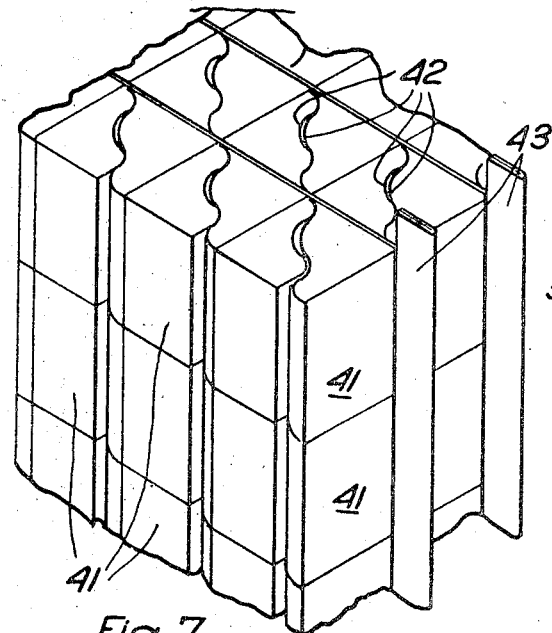
FIG. 7 is a perspective view illustrating the application of the invention to separate skin-packs of interlocking shape.
Figure 8:
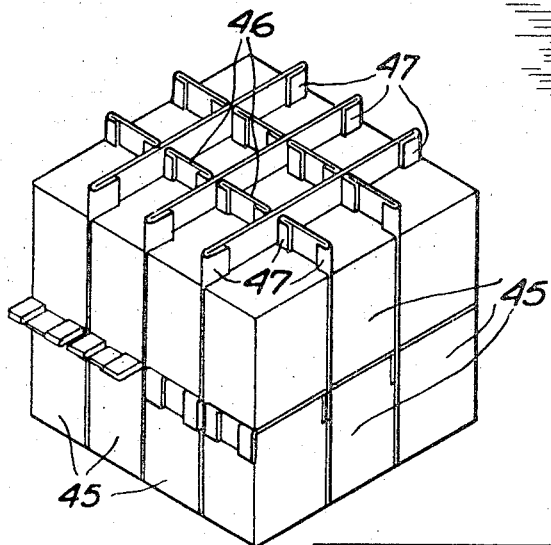
FIG. 8 is a perspective view of a development of FIG. 1.

The goods may therefore as illustrated by FIG. 6 for carcasses 35 be positioned in an intimately interlocking posture, and one or more heating films 36 suitably distorted or specially made, are placed between these goods while they are frozen into a block 37 of ice or other compatible solid of suitable melting point, such as gelatine, pitch, wax or asphalt. The block may then be kept strapped by steel bands, ropes or chains 38 during transport. Elastic edge cushioning 39 is placed between these ties and the block, so that the block is always under the elastic pressure of the ties, irrespective of the differences of the coefficient of thermal expansion of the respective materials.

Where there is some objection to freezing the goods directly into the block forming material, for instance in ice, each article or portion of goods may be packed first in an impermeable adherent skin, such as a plastic shrink film, and the goods thus packed i.e. the slices, slabs, or in general subblocks are stacked or placed in an interlocking position for freezing or "potting" into a large bulk block. For example as shown in FIG. 7 the complete bulk block may be made up of layers each comprising subblocks 41 of constant horizontal cross section, this cross section being partly curved at 42 with the curve of one subblock intermeshing with that of another. As shown the films are only disposed vertically with busbars projecting at 43, but they could be disposed horizontally between the layers, or both vertically and horizontally depending on the degree of partitioning to be provided for. Only one heating film is in general provided between adjacent skin enclosures, but in particular cases the heating film itself can be used as an enveloping skin similar to the shrink film referred to above; a shrink-type heating film can also be used. In such cases there will be at least two films between packages.

Where the actual goods are in individual packages, such as in cans or boxes, it depends on the tightness with which the goods are packed and/or the strength of the package, whether or how these packages are frozen or potted into a bulk block. Generally they require to be completely enclosed in ice or in solidified potting substance, and a heating film has to be interleaved not only at the interface of the vertical slices into which the block will be first separated, but also into each row or column within each slice in order to partition the slice into the individual packages, preferably after it has been separated from the bulk block. FIG. 8 shows an example. Here the bulk block is made up on similar lines to FIG. 4 of rectangular packages 45, but there are two layers, and heating films 46 with accessible terminals 47 are provided between the layers and also between the rows of packages and between the individual packages in a row, this enabling single packages to be removed. The accessible terminals 47 project beyond the external surface of the bulk block, but during transport or storage can be folded down against the surface as indicated in the lower right-hand portion of the FIG.

When the packages are so shaped geometrically that they fit to each other like building blocks without gap or without gaps at boundary surfaces, or when the packages according to the present invention are so shaped that they can snugly nest or stack into each other so that they contact each other over the full area of their common boundary surface, i.e. over their entire interface, they can, according to the present invention, be formed into a block and be separated from the block by the heating film in conjunction with a hot melt adhesive instead of by the heating film in conjunction with freezing or potting with water or compounds applied to the packages as liquids during or after the stacking process.

Such packages, for instance crates, are coated over the whole interface with a hot melt adhesive coating which is dry and has good cohesive strength at ambient temperature and at all temperatures encountered during the storage, transport, or handling or the package. It can be colored and applied so as to have a decorative effect; it can, for instance be applied by stencilling or screen printing with heated screens and heated squeegees.

The coated packages are assembled in a bulk block, e.g. by stacking, a heating film equal in area to the whole interface being interleaved at each interface and care being taken that the interface is under strong even pressure while the film is connected to an electricity supply until the hot melt adhesive on the interface liquifies. This is a very quick process. The pressure is maintained until the interface has cooled down and attained such solid strength that the adjacent packages adhere firmly to each other.

Instead of coating the crates with hot melt adhesive, a heating film with a layer of hot melt adhesive or with a paper impregnated with a hot melt adhesive on both sides of the metal foil pattern can be used and the crates be stuck together by placing this type of heating film between them and keeping them pressed together while the film is connected to a low voltage supply and afterwards until the adhesive has cooled down again.

Figure 9:
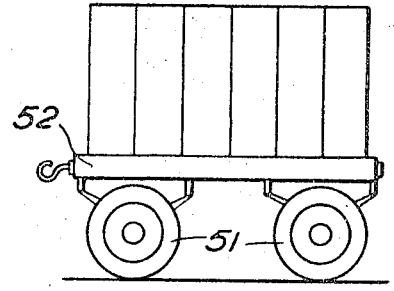
FIGS. 9 and 10 illustrate the provision of a bulk block prepared according to the invention, with wheels for transport, and with means converting it into a float, respectively.
Figure 10:
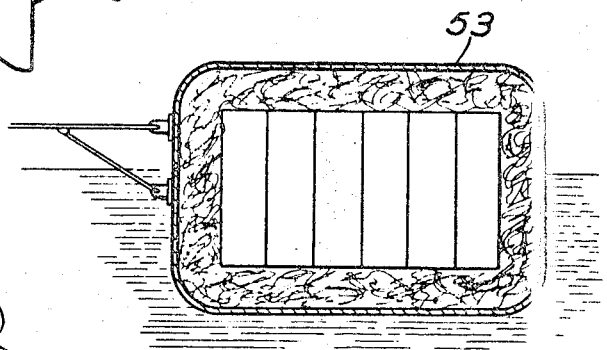

When the subblock is completed and, if desired, additionally strengthened by straps or ropes and/or as well as beams or struts, it can be transformed into a trailer by being provided as in FIG. 9 with wheels 51 if need be through an undercarriage 52, or it can be enveloped in waterproof cellular material 53 as in FIG. 10 and transported as a float, e.g. on a river. Such purposes can be taken into consideration when the block is formed, when it is correspondingly given such a shape, weight distribution and reinforcements as to provide it with a character as near as may be practical to a raft, lighter, barge or other vehicle.

Figure 11:
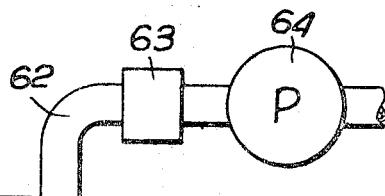
FIG. 11 illustrates the application of the invention to accelerated freeze-drying of biological material.
Figure 11:
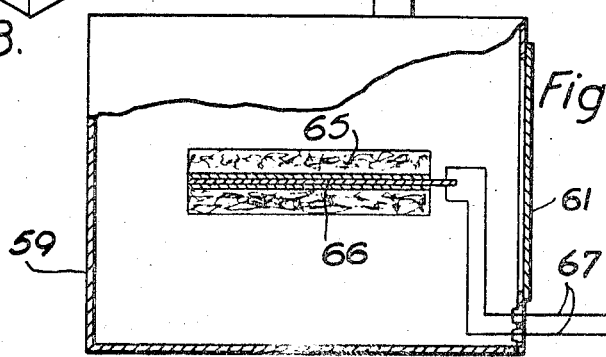

FIG. 11 illustrates the application of the invention to a case when the function of the heating film is to supply heat to an interface at which a frozen material has to be sublimed, that is to say converted directly into vapor without passing through a liquid phase. In this way the material loses all cohesion and is moved by diffusion, the interface at which the sublimation takes place moving through the material. The particular example illustrated in the FIG. is the removal of moisture from a biological material undergoing accelerated freeze-drying. As is well-known sublimation requires appropriate pressure conditions and such freeze drying has to be done under vacuum conditions.

In FIG. 11 there is accordingly a gastight enclosure 59 having an access door 61 and a connection 62 through a condenser 63 to a vacuum pump 64. The biological material being dried is indicated at 65 and an electrical resistance heating film 66 is embedded within the central zone of the body 65, this being the zone which remains frozen to the last. Electric current is supplied to the film 66 during the drying operation by means of cables 67. The film itself is preferably perforated so that it does not form an impervious barrier within the material. The current is supplied at sufficient intensity to supply the heat of sublimation to the material 65 during the drying operation in vacuum and this heat can travel through the thickness of the material over the good heat conducting path of the still frozen material out to the layer at which the ice is sublimed. Hitherto the heat had to be transmitted to the outside surfaces of the material by conduction or radiation and thus proceed to the layer at which sublimation takes place over the bad heat-conductive path of the thickness of the dried material. The resistance to the heat flow from the outside grows as the drying progresses, and thus the speed of drying is slow and the operation costly. The above described use of the heating film overcomes these disadvantages and as the heating film is dispensable and need not be removed from the dried material, this method results in supplies of dried material with a heating film already immersed in it ready for packing e.g. as food which after reconstitution can be heated in the package by the same heating film. If the food is to be packed in single portions, separate heating films or a heating film readily severed into corresponding portions may be used.

The next two examples are concerned with a body which is a layer of fusible solid material of substantial thickness, the whole of that part of which lying beyond the interface is to be removed. To this end a heating film is disposed substantially parallel to the interface on the side away from that part of the layer which is to be removed and in heat conductive relationship with the layer. Current is supplied for a period which governed by the heat conductivity of the layer, the distance from the film to the interface and the ambient pressure just raises the temperature at the interface sufficiently to fuse the material there and the material beyond the interface is then displaced by mechanical forces.

Figure 12:
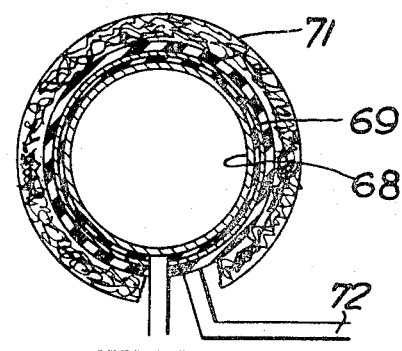
FIG. 12 illustrates the application of the invention to the removal of ice from a condenser.
Figure 12:
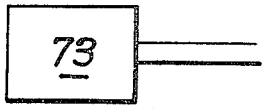

The first example is the condenser which cooperates in an evacuation system with the vacuum pump in order to achieve the vacuum required. Its role in the evacuation system is the condensation of the vapor as ice on its surface so that the vacuum pump can operate. Its initial efficiency is good, but the longer the evacuation the thicker the ice formation on the condenser surfaces and the lower therefore its efficiency. Such a condenser is quite commonly a length of tubing bent into a serpentine, or some similar form, and FIG. 12 is a cross section of such a tube which is marked 68. In applying the present invention a heating film 69 is tightly stretched over the surface of the tube. The film desirably constituted by a metal foil conductive layer with the minimum insulation necessary thus presents very low impedance to the passage of heat through the wall of the condenser.

The contact between the film and the wall of the condenser is preferably perfected by a layer of grease between the two and for the same reason though the invention is not limited to a tubular condenser, the condenser surfaces over which the film is stretched are preferably curved so that tight contact is obtained. A vacuum system of this character is used in accelerated freeze-drying plant, but there are also other fields of use.

At intervals during the evacuation period depending on the rapidity with which the ice 71 builds up, the film is supplied with current through cables 72 at a sufficient rate and for a sufficient time to give the interface between the ice and the film a heat shock sufficient to melt the ice in contact with the film and a mechanical movement suitably a vibration is transmitted to the ice which slides off. An electrically operated vibrator coupled to the tube 68 is indicated at 73, and this would be switched on and off in properly timed relationship to the heating film. It would be possible instead of releasing the ice from the film to slide the film with the adhering ice off the condenser, but the above described arrangement is preferable.

Figure 13:
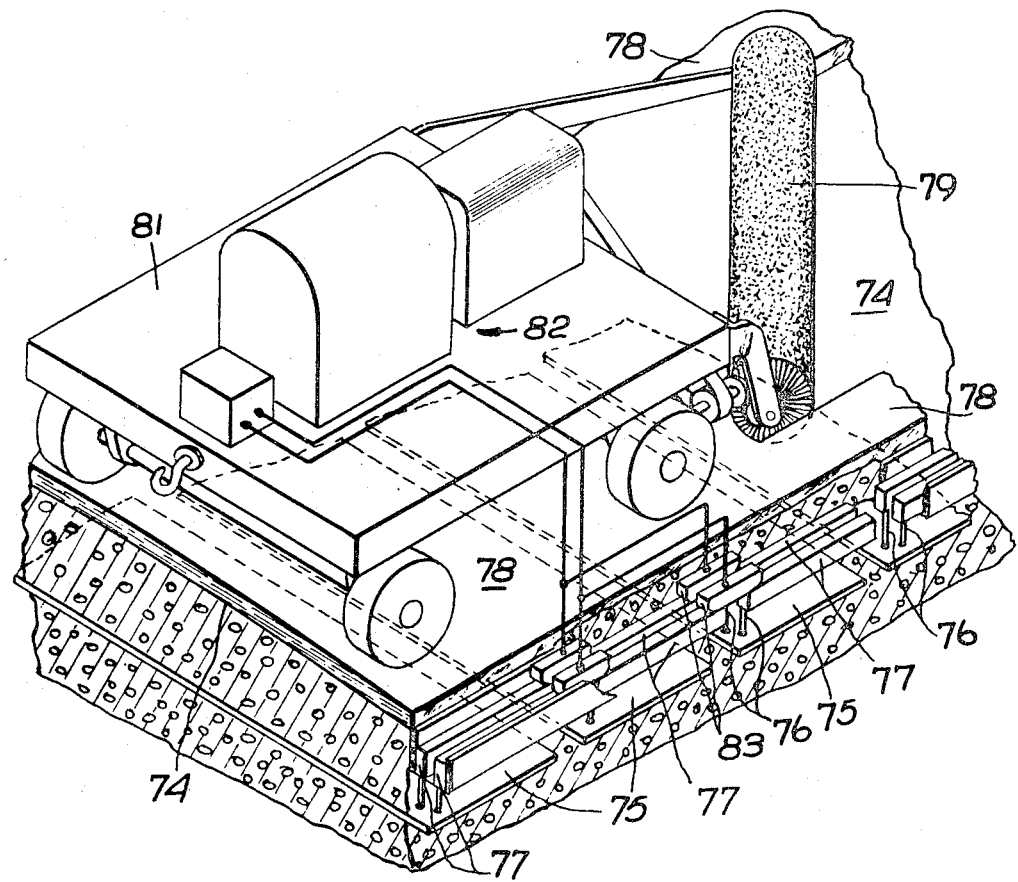
FIG. 13 illustrates the application of the invention to the removal of ice from a road, runway or like surface.

The second example in which melting at an interface is followed by removal of the material from the interface by mechanical forces is the deicing of a road, runway or the like surface. Here as shown in FIG. 13 where the surface in question is marked 74, heating films 75 are embedded at a convenient distance below the surface. They may for instance be laid within the thickness of the surface layer itself during construction similar arrangements can be employed in the building or prefabrication of drainage channels, pipes or other constructions of wall forming materials, and they remain therein and their terminals, marked 76, are left accessible, or provided with all as disclosed in my copending application Ser. No. 549,681 filed May 12, 1966 now Pat. No. 3,510,547. The terminals are connected to accessible conductor rails 77. When ice indicated at 78 forms on the surface 74 the films are energized just long enough to melt the ice at the interface and thus deanchor it, and the ice is then pushed away by mechanical equipment for instance a rotary brush 79 or pusher device.

Preferably to keep the electrical load within bounds the films are energized successively in front of the mechanical equipment so that the deanchored ice is progressively pushed away in a corresponding sequence to the switching of the films. Thus the brush 79 may be carried at the rear of a vehicle 81 carrying a generating plant 82 supplying the films 75 in advance of the brush 79 through shoes 83 in sliding contact with the rails 77.

The embedded films under suitable conditions could also be used for frost prevention.

Other examples of the application of the invention are to cases in which the critical reduction of viscosity by heat results in the material going through a liquid phase. Particular examples are the removal of fusible or fusible and vaporizable substances from a package so that the package holds the body within a predetermined external form to prevent escape in undesired directions of any part of the body, the viscosity of which has been reduced sufficiently to enable it to flow. The heat necessary is dissipated by a film, thus producing an interface at which the critical reduction in viscosity takes place and in applying the present method to such a case the film is maintained either in the interface or in the neighborhood of it, the film thus moving with the interface.

Figure 14:
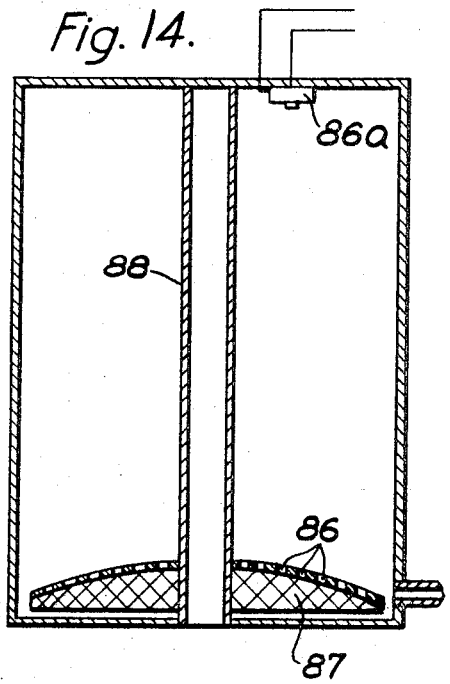
FIG. 14 illustrates the application of the invention to the removal of a fusible substance stored in solid form in a container.

The example shown in FIG. 14 concerns the melting of a solid material, for instance paraffin wax or phenol in a drum which may be a dispensable drum. At the bottom of the drum a heating film 86 is fixed to the upper surface of a part spherical disk 87 of a diameter slightly smaller than that of the drum. It has a lower specific weight than the wax or phenol so that it rises as melting proceeds. The heating film is thus kept always pressed against the bottom of the solid material, even when the solid mass breaks off the walls and sinks. The disk 87 may be guided over a central guide 88. When all the solid has been melted the film reaches the top of the drum where it can actuate a signal or a cutoff switch 86a. This method of heating is most economical and avoids overheating, both in time and temperature.

Figure 15:
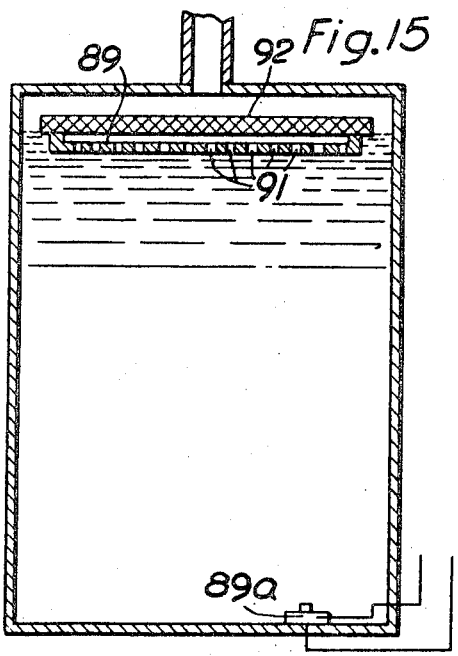
FIG. 15 illustrates the application of the invention to the removal of a vaporizable substance for a storage container.

The example illustrated in FIG. 15 concerns a solid or liquid which has to be vaporized steadily without bringing the whole mass to the boil. A heating film 89, with ample perforations 91 is located at the top of the liquid or solid mass, sunk or embedded into it just enough to be reliably covered, and arrangements are made, e.g., by a floating frame 92 always to maintain this distance of the film from the surface. When needed the film is fully switched on. It heats the surface layer of the material to boiling point and supplies to it the heat of vaporization which starts in the case of a solid long before all the solid is melted adjacent to the bottom of the part which is liquid. As the liquid vaporizes, the liquid level and the heating film tied to this level descend until the film reaches the bottom where it can actuate contacts of, for instance, an automatic switching device 89a. A similar scheme can be used to render a liquid more fluid for discharge for use.

Further the method of the invention is applicable to a fusible material for building, civil engineering and like purposes, the heating film being located within a space in which the material is to be caused to flow and spread by virtue of the reduction in viscosity produced by the energizing of the film. Thus the film may be inserted in the material or be placed over which the material is then spread. Such materials are for instance asphalt or other bituminous compounds, coal tar, calking, gap-filling and jointing compounds, which are dispensed either as hot liquids from a vessel or container, bag, drum, spreader or the like (which itself may contain a heating film effecting the heating for dispensing) or granular form. The heating film extending over the area of application or located within the space filled by those materials has the function of either making the already liquid materials still hotter, less viscous and better flowing, or, if the materials are powdery or granular, of liquefying them in the first place.

The heating film can have perforations and can be placed within a substance in any configuration most efficient for the desired timing and heat transmission to the substance.

As compared with materials enclosed with the heating film in a package, so that the film acts under conditions which can to a large degree be predetermined, the use of the heating film on site in building, civil engineering or similar operations may present problems in achieving convenience and efficiency. However the best configuration, best spacing of parallel layers of the film, progress of heating and of flow of the substance, can be experimentally studied in cross-sectional models. A container with at least one window enabling a cross-sectional view of the model layout to be taken, for instance having at least one transparent wall parallel to the cross section of the heating film configuration to be investigated constitutes a viewing box for visibly observing the heating effect, and such a box is a convenient experimental tool for optimizing many parameters of the arrangement, such as location of heating films within the substance and on its boundaries, loading of the film or particular areas of the film in watts per unit area, distribution and structure of the substance, container shape and so forth.

The observation of the temperature rise at critical points in the viewing box can be carried out by the provision of thermocouples or other temperature sensing devices at these points, and where no visible change in the substance occurs during the proposed heating cycle, material or film can be colored with temperature indicating chemicals (dyes or pigments).

In general in any of the applications of the present invention instead of using a single film on the surface of or within the material, a plurality of parallel films may be disposed within the material or one on the surface and another or others parallel thereto within the material. Each film may be replaced by a series of coplanar films.

There remains two further examples within the scope of the invention which will be described.

A similar method to that described above with reference to FIGS. 14 and 15 can be employed for piercing a hole or recess into a frozen or other liquifiable solid by fixing a perforated heating film on the end of a tube, pressing this end of the tube against the solid while current is supplied to the heating film, and removing the molten liquid by suction.

The heating film can also be employed not only for deicing as described above with reference to FIG. 12 but for refrigeration itself. In the case of an absorption refrigerator since the method of invention enables the heat to be applied with little inertia over a very large area the times of the alternate phases of absorption of the vapor and of regeneration of the solid can be substantially shortened, and larger quantities of absorbent solids can be used and used more efficiently. In this particular application the film will be porous or perforated and is disposed within the absorbent materials in a series of parallel layers or preferably made into flat bags which enclose a very thin layer of the absorbent solids. A maximum surface of solids is therefore presented to the vapor coming from the evaporator and exposed to the heat carried at high rate to the solids from the large surface area of the film.

A suitable arrangement comprises at least two chambers A and B filled with absorbent solids and heating film and the necessary piping, valves and switching to effect the following cycle of operation.

First phase, chamber A acts as evaporator, its solids are wet and its heating film is on. Chamber B is connected with the condenser. Its solids are dry and its film is off. Vapor flows from A via condenser to B where it is absorbed. At the end of the first phase the solids in chamber A are dried and those in chamber B are wet.

In the second phase, chamber B acts as evaporator and its heating film is switched on. Chamber A is connected with the condenser, its heating film is off and the vapor is absorbed by its solids. After this second phase the cycle repeats with the first phase and so on. The heating film temperature need not rise much above the temperature required for regeneration and the small mass of the film enables it to cool and heat rapidly so that changes from one phase to another both on the film and in the powder can take place very quickly. This property together with the large surface area of the film enables absorption refrigerators of larger capacity to be built than at present possible.

I claim:

1. A method of effecting separation of part of a body from the rest of the body said body comprising between said part and the rest of the body a layer of a substance the viscosity of which can be reduced by heat to such an extent that the cohesive forces in the layer essential and adequate to maintain the body intact under ambient conditions are critically weakened, said method including the steps of positioning within the body a dispensable electric resistance heating film of area approximating the area of said layer and of negligible mass and bulk and of substantially uniform heat distribution over at least predetermined zones of the area of the film in such close spatial and heat-conductive relationship to said layer that heat dissipated by the film will reach said layer without substantial delay and thereby reduce its viscosity, transporting said body away from the point at which the film has been positioned in relation thereto, and supplying sufficient electrical energy to the film for the resulting dissipation of heat to be at least that necessary to achieve the critical weakening of the cohesive forces in said layer.

2. A method according to claim 1 in which when the critical weakening of the cohesive forces in said layer has been achieved direct forces are brought into action whereby the part of the body is caused to slide in relation to the rest of the body, so separating the part of the body from the rest of the body.

3. A method according to claim 1 in which the operations are effected under ambient conditions.

4. A method according to claim 1 in which the film is located within said body in direct contact with said layer.

5. A method according to claim 1 which includes the steps of forming a bulk block incorporating material to be transported and also incorporating a plurality of electric resistance heating films defining subblocks into which the block is to be divided, the block consisting, at least at zones with which the films are in heat-conductive relationship, of a thin layer of fusible substance, and the heating films having terminal areas accessible from outside the block.

6. A method according to claim 5 in which the block comprises the material to be transported held together by ice.

7. A method of transporting material in bulk and separating portions thereof which comprises forming a bulk block of packages of the material held together by layers of fusible adhesive positioning electric resistance heating films in heat-conductive relationship with said layers of fusible adhesive, the heating films having terminal areas accessible from outside the bulk block, transporting the bulk block away from the point at which it was formed, and when a point is reached where a package of material is to be separated, supplying sufficient electrical energy to at least one film in heat-conductive relationship to at least that layer of fusible adhesive which hold said package to the rest of the block for the resulting dissipation of heat to be at least that necessary to achieve critical weakening of the cohesive forces in said layer.

8. A method according to claim 5 in which the block comprises mechanically interfitting sections held together by fusible substance within which the heating films are embedded.

9. A method according to claim 1 in which the body comprises a layer of vaporizable substance associated with a layer of solid material unaffected by the heat necessary to vaporize the vaporizable substance and the heating film is disposed at a spacing from an interface at which vaporization is to be effected, while current is supplied to the film for a period which, governed by the heat conductivity of the layer of solid material, the distance from the film to the interface, and the ambient pressure, just raises the temperature at the interface sufficiently to effect the required vaporization of the vaporizable substance at the interface.

10. A method according to claim 9 in which the body is a biological material undergoing accelerated freeze drying and the heating film is embedded within the body and is supplied with current at a sufficient rate to supply the heat of sublimation during the drying operation in vacuum.

11. A method according to claim 10 in which the film is places at the zone of the body which remains frozen to the last.

12. A method according to claim 1 in which the body is a layer of fusible solid material of substantial thickness the whole of that part of which lying beyond an interface is to be removed and the heating film is disposed substantially parallel to the interface on the side away from that part of the layer which is to be removed and in heat conductive relationship with the layer, while current is supplied to the film for a period which, governed by the heat conductivity of the layer, the distance from the film to the interface, and the ambient pressure, just raises the temperature at the interface sufficiently to fuse the material at the interface, the method including the further step of then displacing the material beyond the interface by mechanical forces.

13. A method according to claim 12 in which the body is the ice formed on a condenser in a vacuum system and the heating film is held tightly in contact with the surface of the condenser, the method including the steps of rapidly raising the temperature of the film from time to time to melt ice immediately adjacent the film and simultaneously effecting mechanical movement of the ice to release it.

14. A method according to claim 12 in which the body is ice formed on a road, runway or the like surface and the film is embedded a little below and substantially parallel with the surface, while current is supplied just long enough to melt the ice layer at the surface-ice interface, and the ice so deanchored is pushed away mechanically.

15. A method according to claim 14 in which sections of film are successively switched on and the deanchored ice is progressively pushed away mechanically in a corresponding sequence.

16. A method according to claim 1 in which the body is a solid substance the whole of which is capable of having its viscosity critically reduced by heat, the dissipation of heat by the film thus producing an interface between a part of the body wherein the reduction in viscosity has critically weakened the cohesive forces of the substance and a part of the body wherein the reduction in viscosity has not critically weakened the cohesive forces of the substance, the method including holding the body within a predetermined external form to prevent escape in undesired directions of any part of the body the viscosity of which has been reduced sufficiently to enable it to flow, and maintaining the film at least in the neighbourhood of said interface.

17. A method according to claim 16 in which the substance is a fusible solid held in a container from which it is to be discharged in liquid form and the film is held against the bottom of the solid material so as to progress upwardly as the material melts and flows away.

18. A method according to claim 16 in which the material is a vaporizable solid held in a container from which it is to be discharged in vapor form and the film when energized is first caused to descent from the top to a predetermined depth into the material as it melts, and is then maintained at that depth from the upper surface as the material evaporates.

19. A method according to claim 1 in which the material is a fusible material for building, civil engineering and like purposes and the heating film is located within a space in which the material is to be caused to flow and spread by virtue of the reduction in viscosity produced by the energizing of the film.

20. A method according to claim 1 in which the body includes a plurality of parallel layers of said substance and a plurality of parallel films are disposed within the body each in direct contact with a layer of said substance.

21. A method according to claim 1 in which the film includes a conductive layer between two thin insulating layers one of which has better thermal conductivity than the other.